Sept. 9, 1924.

H. B. MILLER

VEHICLE SPRING

Filed March 27, 1923

1,507,848

Inventor
H. B. Miller
By Schwiff
Attorney

Patented Sept. 9, 1924.

1,507,848

UNITED STATES PATENT OFFICE.

HERMAN B. MILLER, OF MANATEE, FLORIDA.

VEHICLE SPRING.

Application filed March 27, 1923. Serial No. 628,086.

*To all whom it may concern:*

Be it known that I, HERMAN B. MILLER, a citizen of the United States, residing at Manatee, in the county of Manatee, State of Florida, have invented a new and useful Vehicle Spring; and I do hereby declare the following to be a full, clear, and exact description of the invention, such as will enable others skilled in the art to which it appertains to make and use the same.

The invention relates to vehicle springs of the type used in connection with automobiles and has for its object to provide a device of this character wherein the stress, incident to the vehicle moving over a rough surface, is taken up in the spring device, and consequently does not reach the frame and body of the automobile. Also to reduce road vibrations and shocks to a minimum.

A further object is to provide an equalizing bar pivoted intermediate its ends to the side rails of the vehicle frame, to the ends of which the inner ends of the front and rear springs are pivoted, thereby distributing the stress and strain, and to provide a coiled spring interposed between the rear end of the pivoted bar and the inner end of the rear spring, which coiled spring, not only takes up the shock but maintains the pivoted bar in normal position, after each shock absorbing operation.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
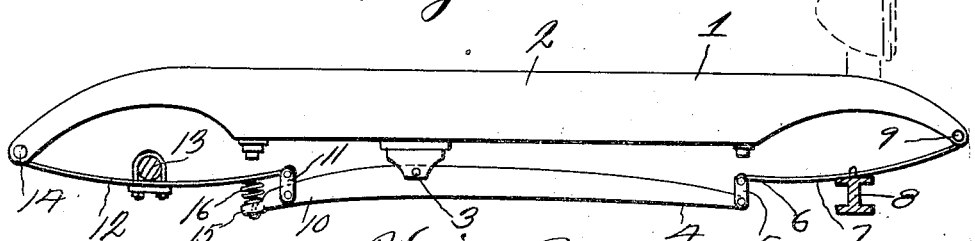
Figure 1 is a side elevation of a vehicle frame, showing the spring device applied thereto.
Figure 2:
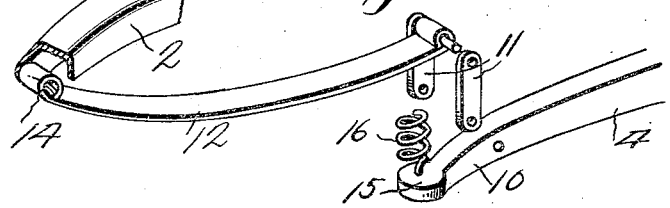
Figure 2 is a detail collective perspective view of members forming the rear end of the spring device.

Referring to the drawing, and particularly to Figures 1 and 2, the numeral 1 designates the vehicle frame, and 2 the side rails thereof. Pivotally connected to the under side of the side rail 2 at 3 is an equalizing bar 4, which bar rocks in a vertical longitudinal plane. The forward end of the bar 4 has a loose connection 5 with the rear end 6 of the semielliptic spring 7, which spring is secured to the axle 8 and has its forward end pivotally connected at 9 to the forward end of the rail 2. The pivotal point 3 is disposed at a point intermediate the ends of the bar 4, however the rear end 10 of the bar 4 has a link connection 11 with the forward end of the rear semielliptic spring 12, which spring is secured to the rear axle 13 and has its rear end pivotally connected at 14 to the rear end of the rail 2. Interposed between the under side of the forward end of the spring 12 and the disc member 15 carried by the bar is a coiled spring 16, which coiled spring during the rocking action of the equalizing bar, incident to shock as the vehicle moves over the ground, will absorb said shock and at the same time will return the equalizing bar to normal position after each shock absorbing operation. It will be seen that shocks on the forward spring will be partially absorbed by the rear spring, and the shocks on the rear spring will be partially absorbed through the rockable bar on the forward spring. The spring 16 is located rearwardly of the link 11, therefore it performs a snubbing action on the forward end of the rear spring 11 during the shock absorbing operation.

Figure 3:
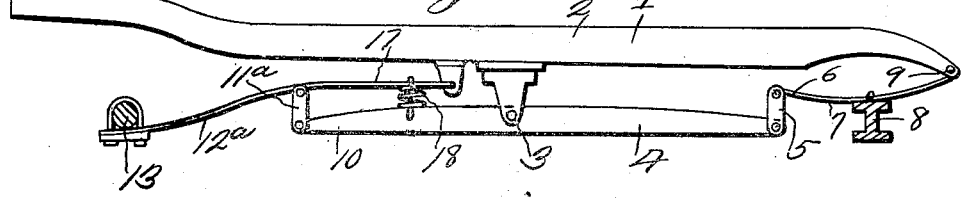
Figure 3 is a side elevation of the vehicle frame showing a modified form of spring device.

Referring to Figure 3 wherein a modified form is provided, the structure is substantially the same with the exception the rear spring $12^a$ has its rear end connected to an axle 13, and the spring is pivotally connected to the rear end 10 of the bar 4 by a link $11^a$, which link is pivotally connected to the spring at a point intermediate its end. The forward end 17 of the spring $12^a$ overlies the rear end of the bar 4, and has interposed therebetween and the bar a coiled spring 18, which absorbs the vibrations and shocks and supports the weight of the rear portion of the automobile. In this form the shocks and strains are taken up in substantially the same manner as in forms shown in Figures 1 and 2.

Figure 4:
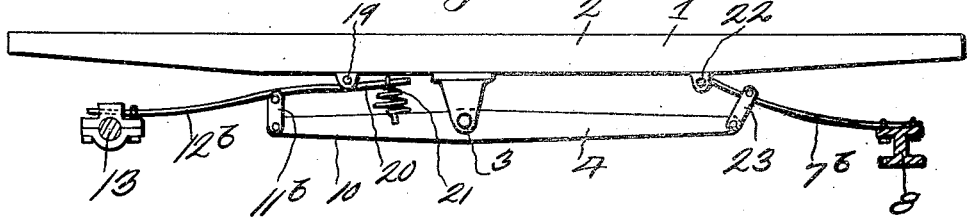
Figure 4 is a side elevation of a vehicle frame showing a further modified form.

Referring to Figure 4, the rear spring $12^b$ has its rear end connected directly to the rear axle 13, and is provided with a link connection $11^b$ with the rear end 10 of the bar 4 at a point intermediate the ends of the rear spring. The forward end of the rear spring 12$^b$ is pivotally connected at 19 to the under side of the rail 2 and is provided with an extension 20, between which extension and the bar 4, a coiled spring 21 is interposed, which coiled spring takes up the shock upon bound and rebound as the vehicle passes over rough ground. The forward spring 7$^b$ has its forward end connected directly to the axle 8 and extends rearwardly and upwardly and is pivotally connected at 22 to the underside of the rail 2. However intermediate its ends it is provided with a link connection 23 with the forward end of the equalizing bar 4, consequently it will be seen that when either the forward or rear spring is on a bound or rebound, the strain and stress will be taken up in the spring device and equally distributed thereto, thereby relieving the spring from the vehicle body and frame and reducing the vibration thereof to a minimum.

From the above it will be seen that a spring device is provided for an automobile wherein a cantilever principle is utilized and the strain equally distributed through the full length of the vehicle and the shocks on the springs at one end of the vehicle partly taken up by the springs at the other end.

The invention having been set forth what is claimed as new and useful is:—

The combination with the side rail of an automobile frame, axles disposed beneath said rail adjacent its forward and rear ends, of a spring device, said device comprising an equalizing bar below the rail and pivoted intermediate its ends, semielliptic springs having their outer ends connected to the ends of the rail, said springs supporting the axles, said springs extending inwardly towards each other and having their inner ends pivoted to the equalizing bar, one of said springs being pivoted to the equalizing bar at a point spaced from its end and a coiled spring interposed between the last named end of the spring and the adjacent end of the equalizing bar.

In testimony whereof I have signed my name to this specification in the presence of two subscribing witnesses.

HERMAN B. MILLER.

Witnesses:
 WM. COOPER,
 SAMUEL BRYAN SMITH.